United States Patent
Zhao et al.

(10) Patent No.: US 12,548,773 B2
(45) Date of Patent: Feb. 10, 2026

(54) POSITIVE ACTIVE MATERIAL, POSITIVE ELECTRODE PLATE, LITHIUM-ION BATTERY, AND ELECTRICAL DEVICE

(71) Applicant: Hithium Tech HK Limited, HongKong (CN)

(72) Inventors: Yiqing Zhao, Guangdong (CN); Chenxu Fang, Guangdong (CN)

(73) Assignee: HITHIUM TECH HK LIMITED, Hongkong (CN)

( * ) Notice: Subject to any disclaimer, the term of this patent is extended or adjusted under 35 U.S.C. 154(b) by 0 days.

(21) Appl. No.: 18/740,553

(22) Filed: Jun. 12, 2024

(65) Prior Publication Data

US 2025/0070164 A1    Feb. 27, 2025

(30) Foreign Application Priority Data

Aug. 22, 2023 (CN) .................. 202311058729.X

(51) Int. Cl.
| | |
|---|---|
| H01M 4/58 | (2010.01) |
| C01B 25/45 | (2006.01) |
| H01M 4/02 | (2006.01) |
| H01M 4/131 | (2010.01) |
| H01M 10/0525 | (2010.01) |

(52) U.S. Cl.
CPC .......... H01M 4/5825 (2013.01); C01B 25/45 (2013.01); H01M 4/131 (2013.01); H01M 10/0525 (2013.01); C01P 2002/72 (2013.01); C01P 2002/76 (2013.01); C01P 2002/77 (2013.01); C01P 2004/51 (2013.01);

(Continued)

(58) Field of Classification Search
CPC .............. H01M 4/5825; H01M 4/131; H01M 10/0525; H01M 2004/028; H01M 2004/021; C01B 25/45; C01P 2002/76; C01P 2004/51; C01P 2006/10
See application file for complete search history.

(56) References Cited

U.S. PATENT DOCUMENTS

2008/0241645 A1* 10/2008 Pinnell ................ H01M 50/109
                                                               429/231.95
2012/0308896 A1    12/2012 Asari
(Continued)

FOREIGN PATENT DOCUMENTS

| CN | 102009970 A | 4/2011 |
|---|---|---|
| CN | 102449822 A | 5/2012 |

(Continued)

OTHER PUBLICATIONS

Ren, Xin, et al. "Are Fe—Li antisite defects necessarily detrimental to the diffusion of Li+ in LiFePO4/C?." Journal of The Electrochemical Society 169.12 (2022): 120507. (Year: 2022).*

(Continued)

*Primary Examiner* — Tiffany Legette
*Assistant Examiner* — Grace Ann Kenlaw

(57) ABSTRACT

Provided are a positive active material, a positive electrode plate, a lithium-ion battery, and an electric device. The positive active material includes lithium iron phosphate particles. A volume percentage of the lithium iron phosphate particles having a particle size smaller than 1 μm is x, and a volume percentage of the lithium iron phosphate particles having a particle size greater than 5 μm is z, z/x ranging from 0.5 to 2.8.

4 Claims, 5 Drawing Sheets

(52) U.S. Cl.
   CPC ...... *C01P 2006/10* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 2013/0157133 | A1* | 6/2013 | Chen | H01M 4/5825 |
| | | | | 429/231 |
| 2016/0072122 | A1* | 3/2016 | Patoux | H01M 4/625 |
| | | | | 429/221 |

FOREIGN PATENT DOCUMENTS

| | | | |
|---|---|---|---|
| CN | 106816582 | A | 6/2017 |
| CN | 109103434 | A | 12/2018 |
| CN | 109301179 | A | 2/2019 |
| CN | 111697225 | A | 9/2020 |
| CN | 113451548 | A | 9/2021 |
| CN | 113839033 | A | 12/2021 |
| CN | 114068919 | A | 2/2022 |
| CN | 112909238 | B | 4/2022 |
| CN | 114261952 | A | 4/2022 |
| CN | 114455563 | A | 5/2022 |
| CN | 115312763 | A | 11/2022 |
| CN | 115394961 | A | 11/2022 |
| CN | 115863610 | A | 3/2023 |
| CN | 116259736 | A | 6/2023 |
| CN | 116805685 | A | 9/2023 |
| CN | 114744193 | B * | 1/2024 ............. C01B 25/45 |
| JP | 2002151082 | A | 5/2002 |
| JP | 2011134658 | A | 7/2011 |
| WO | WO-2022208049 | A1 * | 10/2022 ........ H01M 10/0525 |

OTHER PUBLICATIONS

International Search Report dated May 7, 2024 in International Application No. PCT/CN2024/075985. English translation attached.
Written Opinion of the International Search Authority dated May 7, 2024 in International Application No. PCT/CN2024/075985. English translation attached.
First Office Action from corresponding Chinese Application No. 202311058729.X, dated Sep. 29, 2023. English translation attached.
The Grant Notice from corresponding Chinese Application No. 202311058729.X, dated Oct. 25, 2023. English translation attached.
Chen Lei et al: "Effects of Particle Size Distribution on Compacted Density of Lithium Iron Phosphate 18650 Battery", Journal of Electrochemical Energy Conversion and Storage, vol. 15, No. 4, Aug. 20, 2018 (Aug. 20, 2018), XP093232513.
He Hao et al: "Dynamic Lithium Intercalation/Deintercalation in 18650 Lithium Ion Battery by Time-Resolved High Energy Synchrotron X-Ray Diffraction", Journal of the Electrochemical Society, vol. 162, No. 10, Jan. 1, 2015 (Jan. 1, 2015), pp. A2195-A2200, XP055946781.
Extended European Search Report dated Dec. Jan. 27, 2025 received in corresponding European Application No. EP24183657.6.

* cited by examiner

POSITIVE ACTIVE MATERIAL, POSITIVE ELECTRODE PLATE, LITHIUM-ION BATTERY, AND ELECTRICAL DEVICE

CROSS-REFERENCE TO RELATED APPLICATIONS

This application claims the priority of the Chinese Patent Application No. 202311058729X, filed on Aug. 22, 2023, which is incorporated herein by reference in its entirety.

FIELD

The present disclosure relates to the technical field of batteries, and more particularly, to a positive active material, a positive electrode plate, a lithium-ion battery, and an electrical device.

BACKGROUND

Lithium-ion batteries, as apparatuses for energy storage and conversion, have various advantages such as high energy density, high working voltage, high energy conversion efficiency, long cycle life, and no memory effect, compared with conventional nickel-metal hydride batteries and lead-acid batteries. A positive electrode material, as the most critical core component of the lithium-ion batteries, is an important factor for determining performances of the lithium-ion batteries in terms of cost, voltage, energy density, rate, cycle, safety, and the like. Among many positive electrode materials of the lithium-ion batteries, lithium iron phosphate ($LiFePO_4$) has characteristics of low price, abundant raw materials, safety, environment friendliness, and good thermal stability.

SUMMARY

In a first aspect, the present disclosure provides a positive active material. The positive active material includes lithium iron phosphate particles. A volume percentage of the lithium iron phosphate particles having a particle size smaller than 1 μm is x, and a volume percentage of the lithium iron phosphate particles having a particle size greater than 5 μm is z, where z/x ranges from 0.5 to 2.8.

In a second aspect, the present disclosure provides a positive electrode plate including a positive current collector and a positive active substance layer coated on the positive current collector. The positive active substance layer includes the positive active material according to the first aspect of the present disclosure.

In a third embodiment, the present disclosure provides a lithium-ion battery including a housing and an electrode assembly disposed in the housing. The electrode assembly includes a negative electrode plate and a positive electrode plate. The positive electrode plate is the positive electrode plate according to the second aspect of the present disclosure.

In a fourth aspect, the present disclosure provides an electrical device including the lithium-ion battery according to the third aspect of the present disclosure.

BRIEF DESCRIPTION OF THE DRAWINGS

The above-mentioned and/or additional aspects and advantages of the present disclosure may become apparent and more readily appreciated from the following descriptions made with reference to the accompanying drawings, in which.

DETAILED DESCRIPTION

Figure 1:
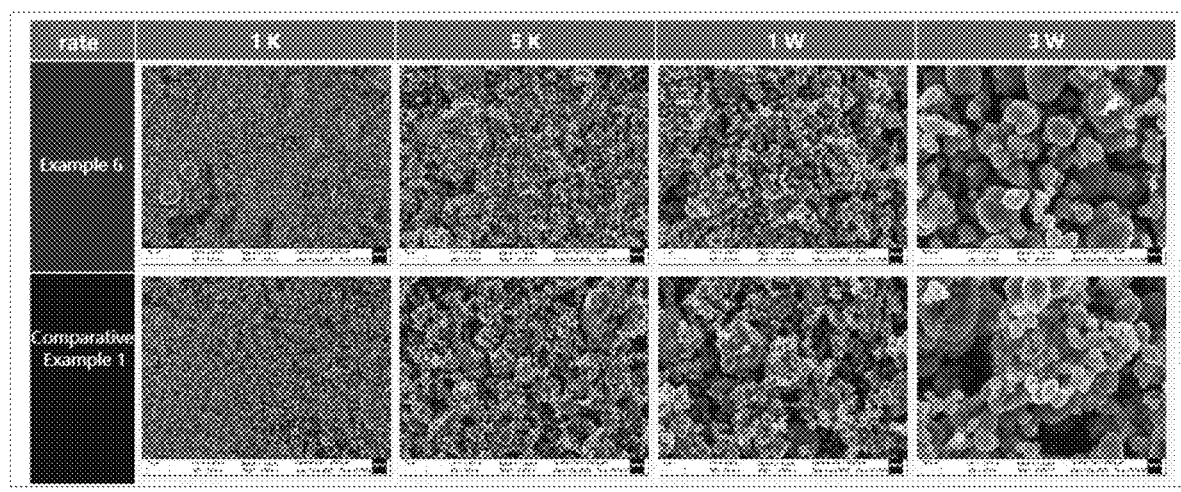
FIG. 1 is a comparison of scanning electron microscope photographs of lithium iron phosphate particles in Example 6 and lithium iron phosphate particles in Comparative Example 1.

Embodiments of the present disclosure may be described in detail below with reference to examples thereof as illustrated in the accompanying drawings, throughout which the same or similar elements, or elements having the same or similar functions, are denoted by same or similar reference numerals. The embodiments described below with reference to the drawings are illustrative only, and are intended to explain, rather than limiting, the present disclosure.

When lithium iron phosphate in the related art is used as a positive electrode material, there are still problems such as great internal resistance and poor conductivity, restricting a further improvement in the performances of the batteries employing lithium iron phosphate as the positive electrode material. Therefore, it is urgent to make further improvements.

The present disclosure aims to at least solve one of the technical problems existing in the prior art. To this end, an object of the present disclosure is to provide a positive active material having a relatively high compacted density. The positive active material can reduce impedance, improve conductivity, and sufficiently exert its own capacity.

A positive active material according to embodiments of the present disclosure is described below.

According to an embodiment in a first aspect of the present disclosure, the positive active material includes lithium iron phosphate particles. A volume percentage of the lithium iron phosphate particles having a particle size smaller than 1 μm is x, and a volume percentage of the lithium iron phosphate particles having a particle size greater than 5 μm is z, where z/x ranges from 0.5 to 2.8.

It should be noted that the volume percentage of the lithium iron phosphate particles having the particle size smaller than 1 μm means a ratio of a total volume of all lithium iron phosphate particles having the particle size smaller than 1 μm in the positive active material to a total volume of all lithium iron phosphate particles in the positive active material; and that the volume percentage of the lithium iron phosphate particles having the particle size greater than 5 μm refers to a ratio of a total volume of all lithium iron phosphate particles having the particle size greater than 5 μm in the positive active material to the total volume of all lithium iron phosphate particles in the positive active material.

According to the positive active material in the embodiments of the present disclosure, by controlling a ratio of the percentage of the lithium iron phosphate particles having a particle size greater than 5 μm to the percentage of the lithium iron phosphate particles having a particle size smaller than 1 μm within a range from 0.5 to 2.8, the positive active material can have a relatively high compacted density. In this way, the impedance can be reduced, the conductivity can be improved, and the capacity of the positive active material can be sufficiently exerted.

When a value of z/x is smaller than 0.5, it indicates that there are many lithium iron phosphate particles of relatively small size. The excessive amount of lithium iron phosphate particles having the relatively small particle size may lead to a relatively low compacted density, relatively small spacing and gaps between lithium iron phosphate particles, relatively small space for absorbing electrolyte, and correspondingly, less electrolyte is absorbed. Thus, the electrolyte cannot infiltrate the lithium iron phosphate particles well, which may lead to a relatively great impedance for lithium ions diffusing between the lithium iron phosphate particles. However, for the lithium iron phosphate particles having the relatively small particle size, charge migration in a single lithium iron phosphate particle may be easier and faster, and impedance of the charge migration is relatively small. In addition, more particles with the same mass may lead to a higher difficulty in dispersion under the same process conditions. A large number of lithium iron phosphate particles having the relatively small size are prone to cause problems of particle agglomeration.

When the value of z/x is greater than 2.8, it indicates that there are more lithium iron phosphate particles having a relatively great size. The excessive amount of lithium iron phosphate particles having the great particle size may lead to a longer diffusion path for the lithium ions in the single lithium iron phosphate particle. The diffusion impedance and an impedance of charge transfer are both greater, and an activity of electrochemical reaction is lowered. However, when there are more lithium iron phosphate particles having the relatively great particle size, the compacted density can be increased, and the spacing and gaps between the lithium iron phosphate particles are larger. Thus, the space for absorbing the electrolyte is larger, and correspondingly, more electrolyte is absorbed. The electrolyte can better infiltrate the lithium iron phosphate particles, allowing the diffusion impedance for the lithium ions between the lithium iron phosphate particles to be relatively small. In addition, if there are many lithium iron phosphate particles having the great, in a process of preparing a positive electrode plate, internal stress of a positive electrode material of the positive electrode plate is relatively long, and the large particles are easy to be broken, resulting in a loss of active substances, formation of dead lithium, and loss of capacity.

In short, the lithium iron phosphate particles having the relatively small particle size have a lower compacted density and a greater diffusion impedance for the lithium ions between the lithium iron phosphate particles. In addition, the lithium iron phosphate particles having the relatively small particle size are prone to agglomeration.

The lithium iron phosphate particles having the relatively great particle size have a higher compacted density and a smaller diffusion impedance for the lithium ions between the lithium iron phosphate particles. However, the impedance of charge transfer is great. In addition, the lithium iron phosphate particles having the relatively great particle size have a problem that large particles are easy to be broken, which results in the loss of active substances.

In present disclosure, the lithium iron phosphate particles having the relatively great particle size and the lithium iron phosphate particles having the relatively small particle size are controlled within a certain range, and particularly, the ratio of the volume percentage of the lithium iron phosphate particles having a particle size greater than 5 μm to the volume percentage of the lithium iron phosphate particles having a particle size smaller than 1 μm is controlled within the range from 0.5 to 2.8. In this way, a ratio of relatively great particles to relatively small particles in the lithium iron phosphate particles can be controlled to be more appropriate, allowing particles to be stacked more reasonably, and allowing the positive active material as a whole to have a higher compacted density. Therefore, the impedance can be reduced, the conductivity can be improved, and the capacity of the positive active material can be sufficiently exerted.

The lithium iron phosphate particles according to the embodiments of the present disclosure may be prepared by a high-temperature solid phase method or a high-temperature liquid phase method. For example, the size and size distribution of the prepared lithium iron phosphate particles may be controlled by controlling reaction parameters (such as reaction time, reaction temperature, and the like).

As an example, according to some embodiments of the present disclosure, a lithium source, a divalent iron source, a phosphorus source, and a carbon source are mixed evenly at a certain ratio by mechanical ball milling or sanding to obtain a precursor; and then, the mixture reacts at a temperature ranging from 600° C. to 1200° C. for 2 hours to 10 hours in an inert atmosphere to obtain lithium iron phosphate particles. The ratio of the lithium source, the divalent iron source, the phosphorus source, and the carbon source may be (1.0 to 1.5):1:1:(0.01 to 0.2), and the ratio refers to the molar ratio.

As another example, according to some embodiments of the present disclosure, a lithium source, a divalent iron source, and a phosphorus source are stirred in a mechanical stirred hydrothermal kettle at a certain ratio (with a solid content ranging from 20% to 60%) for 10 minutes to 120 minutes to obtain a precursor; and then, the mixture reacts at a temperature ranging from 120° C. to 200° C. for 2 hours to 12 hours in an inert atmosphere to obtain lithium iron phosphate particles. The ratio of the lithium source, the divalent iron source, the phosphorus source and the carbon source may be (2.3 to 3.5):1:1, and the ratio refers to the molar ratio.

The lithium source may include at least one of lithium hydroxide (LiOH), lithium carbonate ($Li_2CO_3$), lithium bicarbonate ($LiHCO_3$), lithium sulfate ($Li_2SO_4$), lithium chloride (LiCl), lithium nitrate ($LiNO_3$), lithium oxalate ($Li_2C_2O_4$), and hydrates thereof.

The iron source may include at least one of ferrous oxide (FeO), ferroferric oxide ($Fe_3O_4$), ferrous sulfate ($FeSO_4$), ferric sulfate ($Fe_2(SO_4)_3$), ferric phosphate ($FePO_4$), ferrous chloride ($FeCl_2$), ferric chloride ($FeCl_3$), ferrous nitrate ($Fe(NO_3)_2$), ferric nitrate ($Fe(NO_3)_3$), and hydrates thereof.

The phosphorus source may include phosphoric acid ($H_3PO_4$), or a phosphorus-lithium compound such as lithium phosphate ($Li_3PO_4$), lithium dihydrogen phosphate ($LiH_2PO_4$), or lithium monohydrogen phosphate ($Li_2HPO_4$), and the like.

The carbon source may include glucose, polyethylene glycol, and the like.

For the positive active material according to the embodiments of the present disclosure, by controlling the ratio of the volume percentage of the lithium iron phosphate particles having a particle size greater than 5 μm to the volume percentage of the lithium iron phosphate particles having a particle size smaller than 1 μm within the range from 0.5 to 2.8, the positive active material can have a higher compacted density, the impedance can be reduced, the conductivity can be improved, and the capacity of the positive active material can be sufficiently exerted.

According to some embodiments of the present disclosure, z/x ranges from 1.5 to 2.5. For example, a value of z/x may be 1.5, 1.8, 2.0, 2.1, 2.2, 2.3, 2.4, 2.5, and the like. By further controlling the ratio of the volume percentage of the lithium iron phosphate particles having a particle size greater than 5 μm to the volume percentage of the lithium iron phosphate particles having a particle size smaller than 1 μm within a range from 1.5 to 2.5, the positive active material can have a higher compacted density, the impedance can be better reduced, the conductivity can be better improved, and the capacity of the positive active material can be sufficiently exerted.

According to some embodiments of the present disclosure, a volume percentage of the lithium iron phosphate particles having a particle size greater than 5 μm and smaller than 20 μm is z. By controlling the particle size of the lithium iron phosphate particles having the relatively great particle size in the range from 5 μm to 20 μm, the lithium iron phosphate particles having a relatively great size can have a more reasonable size, which avoids poor particle size consistency of the particles as a result of the particle size of the lithium iron phosphate particles having the relatively great particle size being too large. As a result, the overall performance of the positive active material including the lithium iron phosphate particles can be further improved.

According to some embodiments of the present disclosure, x ranges from 11% to 30%, and z ranges from 5% to 40%. For example, a value of x may be 11%, 15%, 18%, 20%, 23%, 25%, 28%, 30%, and the like, and a value of z may be 5%, 10%, 15%, 20%, 25%, 30%, 35%, 40%, and the like.

By controlling the volume percentage of the lithium iron phosphate particles having a relatively small size in the range from 11% to 30%, and by controlling the volume percentage of the lithium iron phosphate particles having a relatively great size in the range from 5% to 40%, the percentage of the lithium iron phosphate particles having the relatively small size and the percentage of the lithium iron phosphate particles having the relatively great size are within appropriate ranges. The percentage of the lithium iron phosphate particles having the relatively small size and the percentage of the lithium iron phosphate particles having the relatively great size are both controlled within lower ranges. Thus, the lithium iron phosphate particles having the relatively great size and the lithium iron phosphate particles having the relatively small size will not take excessively great proportions. In this way, a distribution of the lithium iron phosphate particles of respective particle sizes in the entire positive active material can be more reasonable, thereby enhancing the overall performance of the positive active material including the lithium iron phosphate particles.

According to some embodiments of the present disclosure, a volume percentage of the lithium iron phosphate particles having a particle size not smaller than 1 μm and not greater than 5 μm is y, and y ranges from 40% to 80%. By controlling the volume percentage of the lithium iron phosphate particles having a particle size not smaller than 1 μm and not greater than 5 μm in the range from 40% to 80%, the lithium iron phosphate particles having a size between 1 μm and 5 μm may take a great proportion in the entire positive active material. Thus, the distribution of the lithium iron phosphate particles of different particle sizes in the entire positive active material is be more reasonable, and thus, the positive active material can have a higher compacted density. In addition, the overall impedance is reduced and the conductivity is better.

It should be noted that the volume percentage of the lithium iron phosphate particles having a particle size not smaller than 1 μm and not greater than 5 μm refers to a ratio of a total volume of all lithium iron phosphate particles having a particle size not smaller than 1 μm and not greater than 5 μm in the positive active material to the total volume of all lithium iron phosphate particles in the positive active material.

According to some embodiments of the present disclosure, a volume of a unit cell of the lithium iron phosphate particles is V in units of $Å^3$, and V ranges from 291.1 to 294.6. If the volume V of the unit cell of the lithium iron phosphate particles is excessively small, the lithium ions are difficult to intercalate. If the volume V of the unit cell of the lithium iron phosphate particles is excessively large, deintercalation of the lithium ions may lead to an unstable unit cell skeleton, thereby leading to structural collapse and further leading to a loss of active substances and capacity. By controlling the volume V of the unit cell of the lithium iron phosphate particles in the rage from 291.1 to 294.6, the unit cell of the lithium iron phosphate particles may have a relatively high structural stability and is not prone to structural collapse. Moreover, it is also beneficial for the deintercalation of lithium ions into lattices of the lithium iron phosphate particles, thereby further improving the electrochemical performance of the positive active material.

According to some embodiments of the present disclosure, a volume of a unit cell of the lithium iron phosphate particles is V in units of $Å^3$, and $(z/x)*(V/300)$ ranges from 0.49 to 2.74. When the volume V of the unit cell of the lithium iron phosphate particles and the above-mentioned z/x satisfy the relationship of $0.49 \leq (z/x)*(V/300) \leq 2.74$, the particle size distribution of the lithium iron phosphate particles and the volume V of the unit cell of the lithium iron phosphate can be also considered. In this way, the particle size distribution of the lithium iron phosphate particles in the positive active material is reasonable, and the stable lattice cell can be formed. Therefore, the positive active material also has a relatively high compacted density, conductivity and gram capacity, and an excellent structural stability, thereby improving the electrochemical performance of the positive active material.

The positive electrode plate according to the embodiments in the second aspect of the present disclosure includes a positive current collector and a positive active substance layer coated on the positive current collector. The positive active substance layer includes the positive active material according to the embodiments in the first aspect of the present disclosure.

According to the embodiments of the present disclosure, since the positive electrode plate includes the above-mentioned positive active material, the impedance can be reduced, and the conductivity is increased, thereby promoting the positive active substance layer to sufficiently exert the capacity thereof.

The lithium-ion battery according to the embodiments in the third aspect of the present disclosure includes a housing and an electrode assembly. The electrode assembly is disposed in the housing. The electrode assembly includes a negative electrode plate, a positive electrode plate, and a separator disposed between the positive electrode plate and the negative electrode plate. The positive electrode plate is the positive electrode plate according to the embodiments in the second aspect of the present disclosure.

For the lithium-ion battery according to the embodiments of the present disclosure, by providing the above-mentioned positive electrode plate as the positive electrode plate, the impedance can be reduced, and the conductivity is increased, thereby promoting the positive active substance layer to sufficiently exert the capacity thereof.

The electrical device according to the embodiments in a fourth aspect of the present disclosure includes the lithium-ion battery according to the embodiments in the third aspect of the present disclosure.

In another embodiment of the present disclosure, the electric device may be an electric vehicle.

For the electric device according to the embodiment of the present disclosure, by providing the above-mentioned lithium-ion battery, the lithium-ion battery may be used as a power source for the electric device. Since the overall performance of the lithium-ion battery is good, the overall performance of the electric device can be improved.

The positive active material according to the embodiments of the present disclosure is further described below in combination with examples and comparative examples.

The lithium iron phosphate particles in the positive active material required for each example and comparative example were prepared. The lithium iron phosphate particles in each example and comparative example were prepared by the high-temperature solid phase method.

Comparative Example 1: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 700° C. in an inert atmosphere for 8 hours to obtain lithium iron phosphate (LFP) particles. For the obtained LFP particles, a ratio of particle size distributions (0 to 1 μm):(1 μm to 5 μm):(5 μm to 20 μm) was 22:78:0, and V was 291.1 $Å^3$.

Comparative Example 2: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 720° C. in an inert atmosphere for 8 hours to obtain lithium iron phosphate (LFP) particles. For the obtained LFP particles, a ratio of particle size distributions (0 to 1 μm):(1 μm to 5 μm):(5 μm to 20 μm) was 24:70:6, and V was 291.2 $Å^3$.

Example 1: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 780° C. in an inert atmosphere for 9 hours to obtain lithium iron phosphate (LFP) particles. For the obtained LFP particles, a ratio of particle size distributions (0 to 1 μm):(1 μm to 5 μm):(5 μm to 20 μm) was 24:64:12, and V was 291.5 $Å^3$.

Example 2: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 790° C. in an inert atmosphere for 8.5 hours to obtain lithium iron phosphate (LFP) particles. For the obtained LFP particles, a ratio of particle size distributions (0 to 1 μm):(1 μm to 5 μm):(5 μm to 20 μm) was 24:71:5, and V was 291.8 $Å^3$.

Example 3: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 800° C. in an inert atmosphere for 8 hours to obtain lithium iron phosphate (LFP) particles. For the obtained LFP particles, a ratio of particle size distributions (0 to 1 μm):(1 μm to 5 μm):(5 μm to 20 μm) was 21:58:21, and V was 292.5 $Å^3$.

Example 4: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 810° C. in an inert atmosphere for 8 hours to obtain lithium iron phosphate (LFP) particles. For the obtained LFP particles, a ratio of particle size distributions (0 to 1 μm):(1 μm to 5 μm):(5 μm to 20 μm) was 13:67:20, and V was 293.2 $Å^3$.

Example 5: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 815° C. in an inert atmosphere for 9.5 hours to obtain lithium iron phosphate (LFP) particles. For the obtained LFP particles, a ratio of particle size distributions (0 to 1 μm):(1 μm to 5 μm):(5 μm to 20 μm) was 12:66:22, and V was 293.8 $Å^3$.

Example 6: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 820° C. in an inert atmosphere for 10 hours to obtain lithium iron phosphate (LFP) particles. For the obtained LFP particles, a ratio of particle size distributions (0 to 1 μm):(1 μm to 5 μm):(5 μm to 20 μm) was 14:55:31, and V was 294.3 $Å^3$.

Example 7: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 850° C. in an inert atmosphere for 12 hours to obtain lithium iron phosphate (LFP) particles. For the obtained LFP particles, a ratio of particle size distributions (0 to 1 μm):(1 μm to 5 μm):(5 μm to 20 μm) was 14:51:35, and V was 294.2 $Å^3$.

Example 8: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 850° C. in an inert atmosphere for 10 hours to obtain lithium iron phosphate (LFP) particles. For the obtained LFP particles, a ratio of particle size distributions (0 to 1 μm):(1 μm to 5 μm):(5 μm to 20 μm) was 14:47:39, and V was 294.1 $Å^3$.

Comparative Example 3: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 780° C. in an inert atmosphere for 15 hours to obtain lithium iron phosphate (LFP) particles. For the obtained LFP particles, a ratio of particle size distributions (0 to 1 μm):(1 μm to 5 μm):(5 μm to 20 μm) was 14:44:42, and V was 294.6 $Å^3$.

Comparative Example 4: lithium carbonate ($Li_2CO_3$), iron phosphate ($FePO_4$), and polyethylene glycol were mixed evenly at a ratio of 1.05:1:0.1 through mechanical ball milling or sanding, and then, the mixture reacted at 780° C. in an inert atmosphere for 18 hours to obtain lithium iron phosphate (LFP) particles. For the obtained LFP particles, a ratio of particle size distributions (0 to 1 μm):(1 μm to 5 μm):(5 μm to 20 μm) was 13:44:43, and V was 294.7 $Å^3$.

The lithium iron phosphate particles prepared in the respective examples and comparative examples were subjected to scanning electron microscope detection, particle size distribution test, X-ray diffraction spectrum, compacted density test, and powder resistivity test, respectively.

The scanning electron microscope (SEM) detection was mainly used to qualitatively analyze the particle size distribution of the lithium iron phosphate particles in the respective examples and comparative examples. The scanning electron microscope detection may also be used to detect the morphology of the lithium iron phosphate particles in the respective examples and comparative examples. The instrument for the scanning electron microscope was Zeiss sigma300, with magnifications of 1 k, 5 k, 1 w, and 3 w.

The particle size distribution test was used to quantitatively analyze the particle size distribution of the lithium iron phosphate particles in the respective examples and comparative examples. The instrument was Master Size 3000, with a measurement range from 0.02 μm to 2000 μm and a detection angle ranging from 0 to 135°. The data of particle size distribution were obtained. The data of particle size distribution were imported into Origin (a software for drawing and data analysis) for graphing, where the horizontal coordinate is the particle size (μm), and the vertical coordinate is the volume distribution (%), to obtain particle size distribution curves. The "Analysis"-"Integral" in origin was clicked. A range from 0 μm to the maximum particle size was selected to obtain integral area 1, which was the total volume of all lithium iron phosphate particles. A range smaller than 1 μm was selected to obtain integral area 2, which was the total volume of all lithium iron phosphate particles having a particle size smaller than 1 μm. A range greater than 5 μm was selected to obtain integral area 3, which was the total volume of all lithium iron phosphate particles having a particle size greater than 5 μm. A volume percentage x of the lithium iron phosphate particles having a particle size smaller than 1 μm=integral area 2/integral area 1, and a volume percentage z of the lithium iron phosphate particles having a particle size greater than 5 μm=integral area 3/integral area 1.

The X-ray diffraction spectrum was used to detect and calculate the unit cell volume of the lithium iron phosphate particles in the respective examples and comparative examples. The instrument and parameters were PANalyticalX'Pert$^3$, Cu target, 5° to 80°, and 5°/min.

The compacted density test was used to measure the compacted density of the lithium iron phosphate particles in the respective examples and comparative examples under different pressures. The instrument was an electronic pressure tester (force test). The sample weight was 1±0.05 g. The pressurized displacement control was 10 mm/min and pressure holding was performed for 30 s. The pressure relief displacement control was 30 mm/min and pressure holding was performed for 10 s. The test pressures were 1T, 2T, and 3T.

The powder resistivity test was used to measure the powder resistivity of the lithium iron phosphate particles in the respective examples and comparative examples under different pressures. The instrument was IEST PRCD3100 (INITAL ENERGY SCIENCE&TECHNOLOGY Co., Ltd), 0 to 200 MPa.

The lithium iron phosphate particles prepared in the respective examples and comparative examples were used as positive active materials. The positive active material lithium iron phosphate, a conductive agent (conductive carbon black, SP), and a binder (polyvinylidene fluoride (PVDF)) were dispersed in a solvent N-methylpyrrolidone (NMP) at a mass ratio of 85:10:5 and mixed evenly to obtain a positive electrode slurry. The positive electrode slurry was coated on a positive current collector, i.e., an aluminum foil, and dried to obtain a positive active substance layer. Then, a positive electrode plate was obtained by stamping. Lithium metal was used as a negative electrode to prepare a button battery. The button battery was subjected to an electrochemical performance test. The electrochemical performance tests included EIS impedance and gram capacity, and the parameters obtained from the tests refer to the following Table 1. It should be noted that the compacted density and powder resistivity listed in the following Table 1 were all measured under a pressure of 30 MPa.

TABLE 1

| No. | z/x | V (Å$^3$) | (z/x)*(V/300) | Compacted density (g/cm$^3$) | Powder resistivity (Ω*cm) | EIS impedance (Ω) | Gram capacity (mAh/g) |
| --- | --- | --- | --- | --- | --- | --- | --- |
| Comparative Example 1 | 0 | 291.1 | 0.00 | 2.45 | 18.04 | 125.32 | 156.47 |
| Comparative Example 2 | 0.2 | 291.2 | 0.19 | 2.45 | 18.06 | 124.88 | 156.57 |
| Example 1 | 0.5 | 291.5 | 0.49 | 2.45 | 17.25 | 124.08 | 157.66 |
| Example 2 | 0.8 | 291.8 | 0.78 | 2.45 | 17.08 | 123.26 | 157.35 |
| Example 3 | 1 | 292.5 | 0.98 | 2.46 | 16.73 | 119.38 | 157.03 |
| Example 4 | 1.5 | 293.2 | 1.47 | 2.47 | 14.36 | 118.36 | 157.66 |
| Example 5 | 1.8 | 293.8 | 1.76 | 2.47 | 13.87 | 118.75 | 157.73 |
| Example 6 | 2.2 | 294.3 | 2.16 | 2.48 | 12.17 | 117.64 | 158.07 |
| Example 7 | 2.5 | 294.2 | 2.45 | 2.51 | 14.97 | 119.67 | 158.01 |
| Example 8 | 2.8 | 294.1 | 2.74 | 2.50 | 16.70 | 125.38 | 157.24 |
| Comparative Example 3 | 3 | 294.6 | 2.95 | 2.49 | 17.25 | 126.79 | 156.32 |
| Comparative Example 4 | 3.3 | 294.7 | 3.24 | 2.44 | 17.36 | 130.36 | 156.21 |

Table 1 reveals that when the ratio of z/x is in the range from 0.5 to 2.8, the lithium iron phosphate particles have a higher compacted density, lower powder resistivity, lower EIS impedance, and a higher gram capacity, thereby reducing the internal resistance and improving the conductivity and capacity. When the ratio of z/x is in the range from 1.8 to 2.5, the overall internal resistance is lower, the conductivity is better, and the capacity is higher.

The photographs of the lithium iron phosphate particles in Example 6 and Comparative Example 1 detected by scanning electron microscope (SEM) refer to FIG. 1. It can be seen from FIG. 1 (in particular, it can be clearly seen at a magnification of 3 w) that the particle size of the lithium iron phosphate particles in Example 6 is greater than that of the lithium iron phosphate particles in Comparative Example 1.

Figure 2:
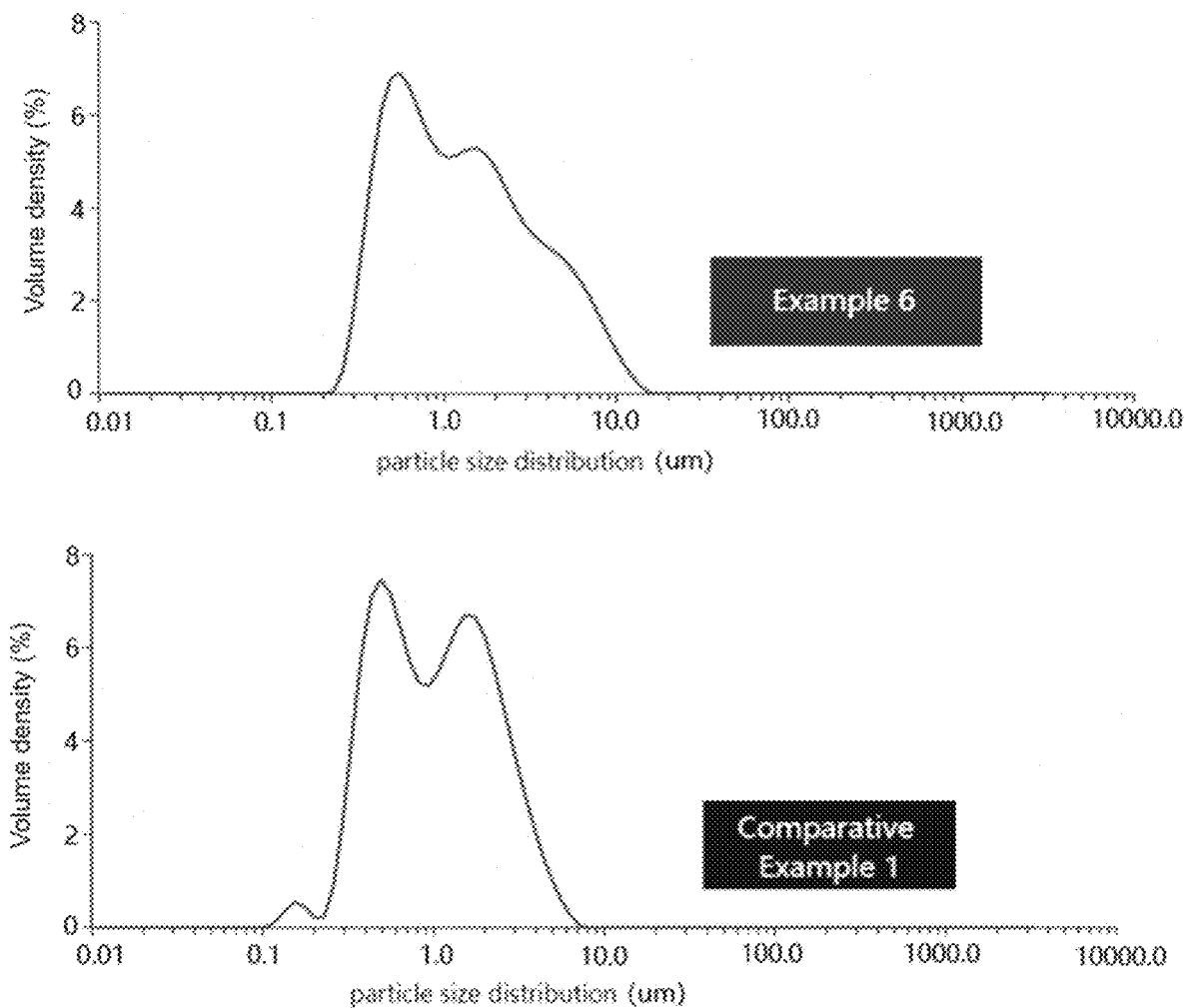
FIG. 2 is a comparison of particle size distribution graphs of lithium iron phosphate particles in Example 6 and lithium iron phosphate particles in Comparative Example 1.

The specific particle size distribution of the lithium iron phosphate particles in Example 6 and Comparative Example 1 was shown in Table 2 and FIG. 2 below.

TABLE 2

| No. | Particle size distribution | | | | |
|---|---|---|---|---|---|
|  | D10 | D50 | D90 | D99 | D100 |
| Example 6 | 0.423 | 1.173 | 5.023 | 10.127 | 14.425 |
| Comparative Example 1 | 0.379 | 1.002 | 2.815 | 4.991 | 6.707 |

Compared with the lithium iron phosphate particles in Comparative Example 1, the lithium iron phosphate particles in Example 6 had a greater overall particle size, and large-sized particles took a greater proportion. In Comparative Example 1, the lithium iron phosphate particles having a particle size in a range from 0 to 1 μm accounted for 22%, the lithium iron phosphate particles having a particle size in a range from 1 μm to 5 μm accounted for 78%, and the lithium iron phosphate particles having a particle size in a range from 5 μm to 20 μm accounted for 0%. In Example 6, the lithium iron phosphate particles having a particle size in a range from 0 to 1 μm accounted for 14%, the lithium iron phosphate particles having a particle size in a range from 1 μm to 5 μm accounted for 55%, and the lithium iron phosphate particles having a particle size in a range from 5 μm to 20 μm accounted for 31%.

Figure 3:
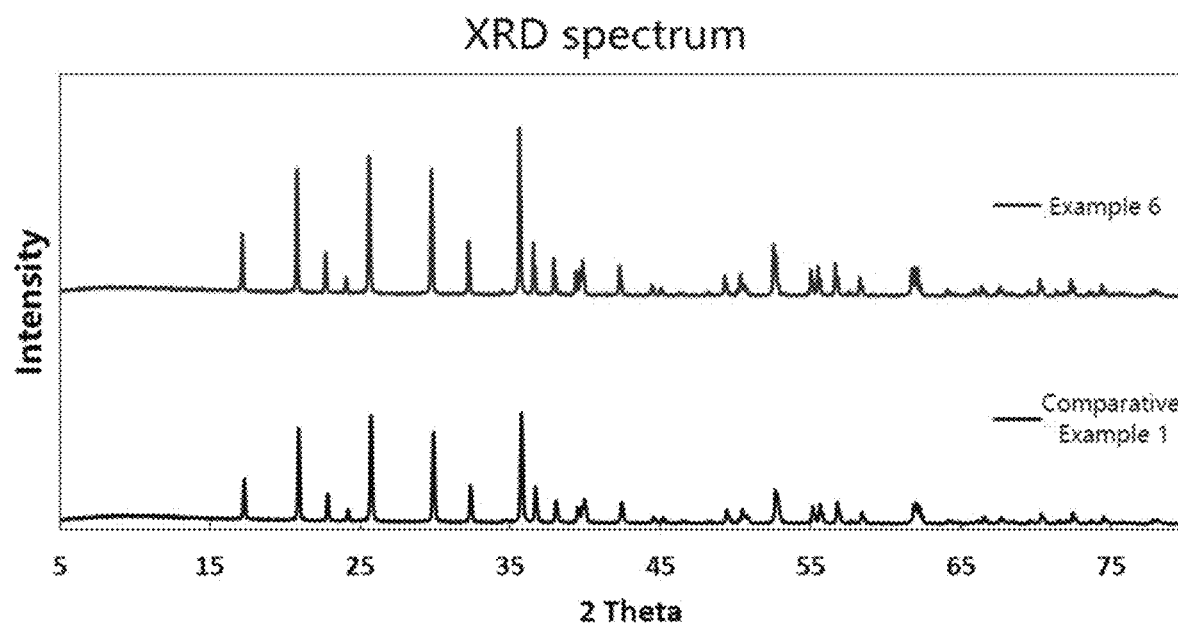
FIG. 3 is a comparison of X-ray diffraction spectrums of lithium iron phosphate particles in Example 6 and lithium iron phosphate particles in Comparative Example 1.

The XRD data of the lithium iron phosphate particles in Example 6 and Comparative Example 1 were shown in Table 3 and FIG. 3. The unit cell of the lithium iron phosphate particles in Comparative Example 1 was slightly shorter on a, b, and c axes, and had a smaller volume of the unit cell, which was 291.1 Å$^3$. Compared with the lithium iron phosphate particles in Comparative Example 1, the unit cell of the lithium iron phosphate particles in Example 6 was slightly longer on the a, b, and c axes, and the unit cell volume was 294.3 Å$^3$.

TABLE 3

| No. | Space group | a (Å) | b (Å) | c (Å) | V (Å$^3$) |
|---|---|---|---|---|---|
| Example 6 | Pnma | 10.32926 | 6.00765 | 4.69362 | 294.30 |
| Comparative Example 1 | Pnma | 10.32839 | 6.00747 | 4.69162 | 291.10 |

Figure 4:
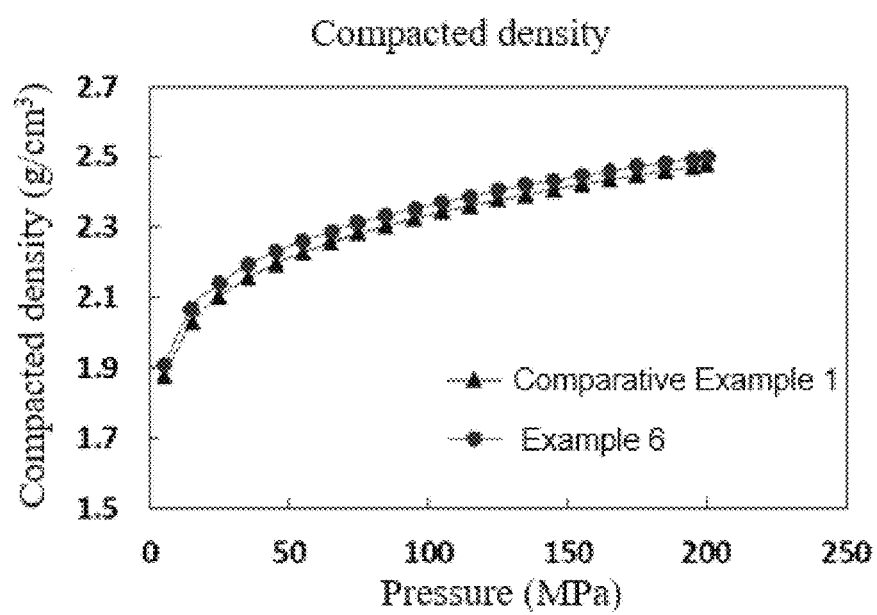
FIG. 4 is a comparison graph of compacted density-pressure curves of lithium iron phosphate particles in Example 6 and lithium iron phosphate particles in Comparative Example 1.

FIG. 4 illustrates compacted density-pressure curves of the lithium iron phosphate particles in Example 6 and Comparative Example 1. Referring to FIG. 4, the compacted density of the lithium iron phosphate particles in Example 6 is higher than the compacted density of the lithium iron phosphate particles in Comparative Example 1 at different pressures.

Figure 5:
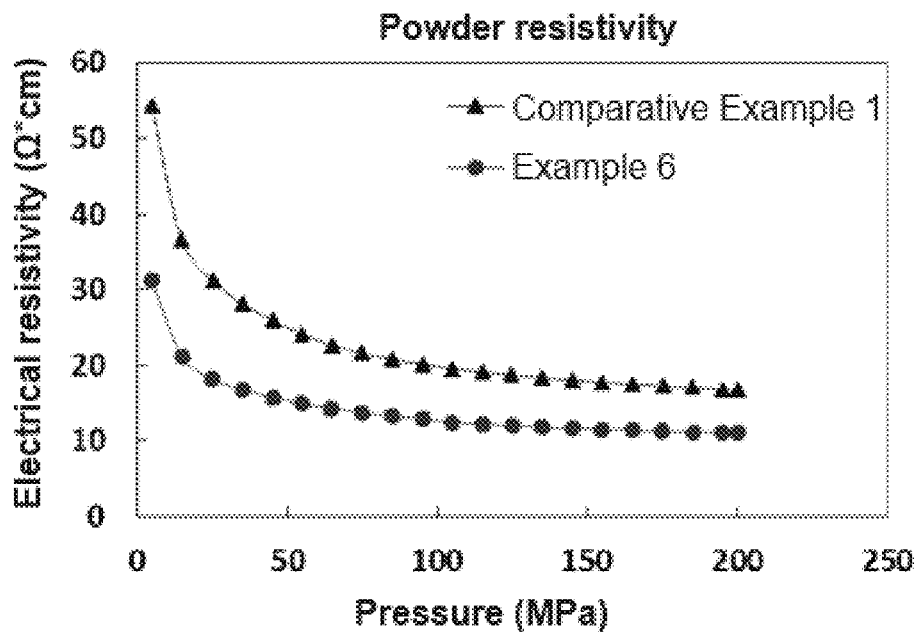
FIG. 5 is a comparison graph of powder resistivity-pressure curves of lithium iron phosphate particles in Example 6 and lithium iron phosphate particles in Comparative Example 1.

FIG. 5 illustrates powder resistivity-pressure curves of the lithium iron phosphate particles in Example 6 and Comparative Example 1. Referring to FIG. 5, at different pressures, the powder resistivity of the lithium iron phosphate particles in Example 6 is always significantly higher than the powder resistivity of the lithium iron phosphate particles in Comparative Example 1.

Figure 6:
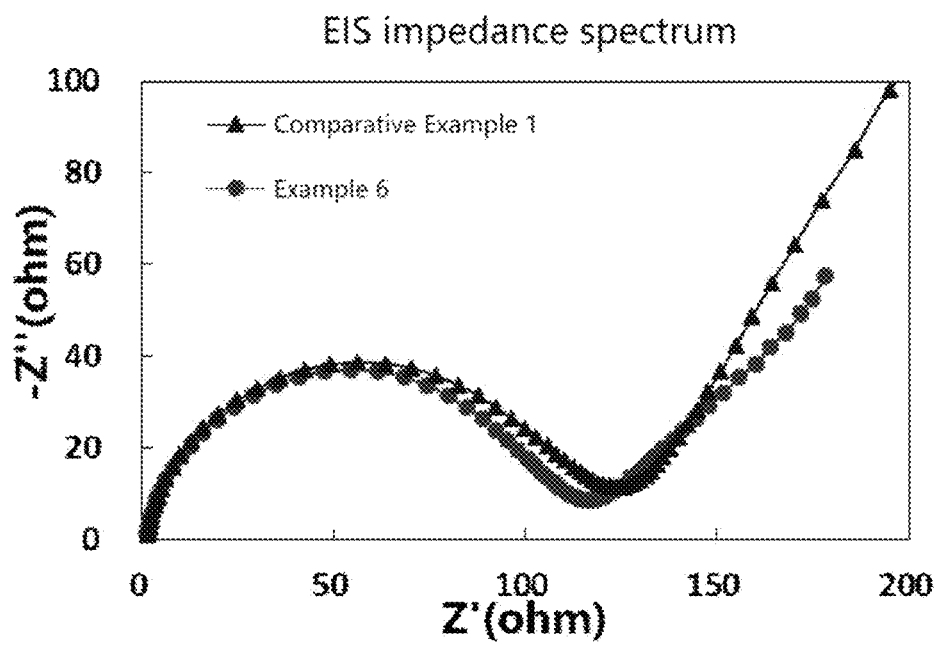
FIG. 6 is a comparison graph of EIS impedance spectrums of button cells corresponding to lithium iron phosphate particles in Example 6 and lithium iron phosphate particles in Comparative Example 1.

Referring to FIG. 6, FIG. 6 illustrates a comparison graph of EIS impedance spectrum of button batteries corresponding to the lithium iron phosphate particles in Example 6 and Comparative Example 1. As revealed by a semicircular arc part of the curves in FIG. 6, the impedance of charge transfer of the button battery corresponding to the lithium iron phosphate particles in Example 6 is smaller than the impedance of charge transfer of the button battery corresponding to the lithium iron phosphate particles in Comparative Example 1, demonstrating that the battery corresponding to the lithium iron phosphate particles in Example 6 has a smaller charge and discharge polarization and thus the capacity can be more sufficiently exerted during the cycle.

Figure 7:
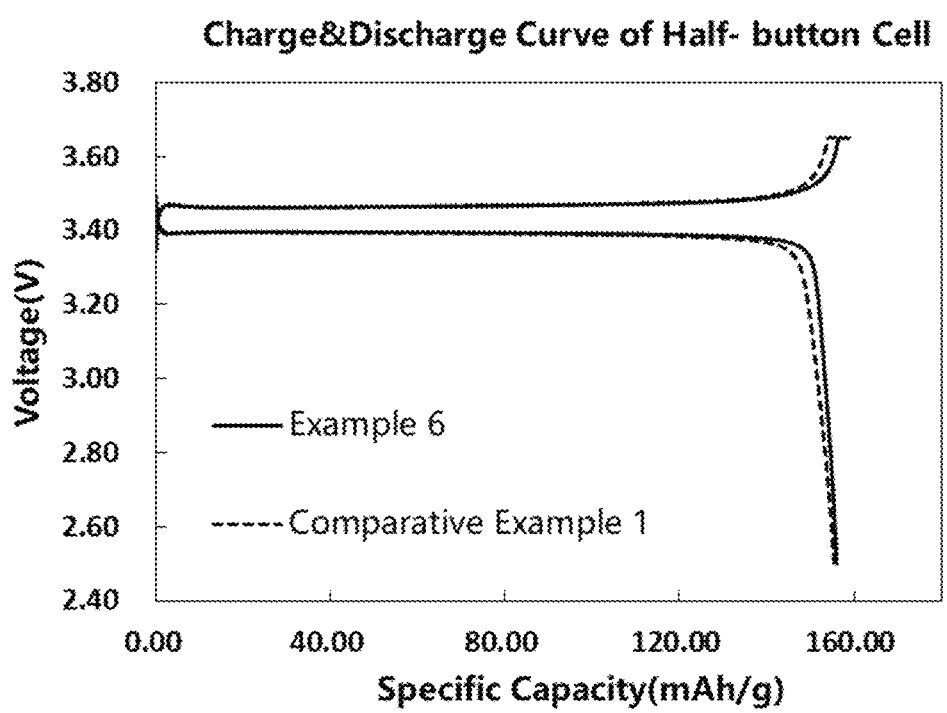
FIG. 7 is a comparison graph of gram capacity-voltage curves of button cells corresponding to lithium iron phosphate particles in Example 6 and lithium iron phosphate particles in Comparative Example 1.

FIG. 7 illustrates a comparison graph of gram capacity-voltage curves of the button batteries of the lithium iron phosphate particles in Example 6 and Comparative Example 1. FIG. 7 reflects charge and discharge capacity exertion. The button battery corresponding to the lithium iron phosphate particles in Example 6 has a gram capacity of 158 mAh/g. The button battery corresponding to the lithium iron phosphate particles in Comparative Example 1 has a gram capacity of 156 mAh/g. The gram capacity of the battery corresponding to the lithium iron phosphate particles in Example 6 is higher than the gram capacity of the battery corresponding to the lithium iron phosphate particles in Comparative Example 1.

In the specification, the description of the reference terms such as "one embodiment", "some embodiments", "exemplary example", "example", "specific example", or "some example" means that the specific features, structures, materials or characteristics described with reference to the embodiment or example are included in at least an embodiment or example of the present disclosure. In this specification, exemplary descriptions of the foregoing terms do not necessarily refer to the same embodiment or example. Moreover, the specific features, structures, materials, or characteristics described may be combined in any one or more embodiments or examples in a suitable manner.

Although embodiments of the present disclosure have been illustrated and described, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. A positive active material, comprising lithium iron phosphate particles, wherein:
   a volume percentage of the lithium iron phosphate particles having a particle size smaller than 1 μm is x, x is 14%;
   a volume percentage of the lithium iron phosphate particles having a particle size not smaller than 1 μm and not greater than 5 μm is y, y ranges from 51% to 55%;
   a volume percentage of the lithium iron phosphate particles having a particle size greater than 5 μm and smaller than 20 μm is z, z ranges from 31% to 35%;
   z/x ranges from 2.2 to 2.5;
   a volume of a unit cell of the lithium iron phosphate particles is V in units of Å$^3$, V ranges from 294.2 to 294.3; and
   (z/x)*(V/300) ranges from 2.16 Å$^3$ to 2.45 Å$^3$.

2. A positive electrode plate, comprising:
   a positive current collector; and
   a positive active substance layer coated on the positive current collector, the positive active substance layer comprising a positive active material, the positive active material comprising lithium iron phosphate particles, wherein:

a volume percentage of the lithium iron phosphate particles having a particle size smaller than 1 μm is x, x is 14%;

a volume percentage of the lithium iron phosphate particles having a particle size not smaller than 1 μm and not greater than 5 μm is y, y ranges from 51% to 55%;

a volume percentage of the lithium iron phosphate particles having a particle size greater than 5 μm and smaller than 20 μm is z, z ranges from 31% to 35%;

z/x ranges from 2.2 to 2.5;

a volume of a unit cell of the lithium iron phosphate particles is V in units of $Å^3$, V ranges from 294.2 to 294.3; and (z/x)*(V/300) ranges from 2.16 $Å^3$ to 2.45 $Å^3$.

3. A lithium-ion battery, comprising:

a housing; and an electrode assembly disposed in the housing, the electrode assembly comprising a negative electrode plate and a positive electrode plate, wherein the positive electrode plate comprises a positive current collector and a positive active substance layer coated on the positive current collector, the positive active substance layer comprising a positive active material, the positive active material comprising lithium iron phosphate particles, wherein:

a volume percentage of the lithium iron phosphate particles having a particle size smaller than 1 μm is x, x is 14%;

a volume percentage of the lithium iron phosphate particles having a particle size not smaller than 1 μm and not greater than 5 μm is y, y ranges from 51% to 55%;

a volume percentage of the lithium iron phosphate particles having a particle size greater than 5 μm and smaller than 20 μm is z, z ranges from 31% to 35%;

z/x ranges from 2.2 to 2.5;

a volume of a unit cell of the lithium iron phosphate particles is V in units of $Å^3$, V ranges from 294.2 to 294.3; and (z/x)*(V/300) ranges from 2.16 $Å^3$ to 2.45 $Å^3$.

4. An electrical device, comprising the lithium-ion battery according to claim 3.

* * * * *